United States Patent
Hebrink et al.

(10) Patent No.: US 7,604,381 B2
(45) Date of Patent: Oct. 20, 2009

(54) OPTICAL ARTICLE AND METHOD OF MAKING

(75) Inventors: Timothy J. Hebrink, Scandia, MN (US); James M. Jonza, Woodbury, MN (US); Randy S. Bay, Woodbury, MN (US); Graham M. Clarke, Woodbury, MN (US); Raymond L. Lucking, Hastings, MN (US); Ta-Hua Yu, Woodbury, MN (US); Terry O. Collier, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 373 days.

(21) Appl. No.: 11/735,684

(22) Filed: Apr. 16, 2007

(65) Prior Publication Data

US 2008/0252980 A1 Oct. 16, 2008

(51) Int. Cl.
*F21V 5/00* (2006.01)
*C09K 19/00* (2006.01)
*G02B 5/02* (2006.01)

(52) U.S. Cl. .............. 362/317; 362/331; 359/599; 428/1.3; 428/847.4; 428/847.7

(58) Field of Classification Search .......... 362/317, 362/19, 330, 331, 339; 359/599, 601, 605, 359/606; 428/1.3, 2, 847.4, 847.7, 848, 848.3
See application file for complete search history.

(56) References Cited

U.S. PATENT DOCUMENTS

| | | | |
|---|---|---|---|
| 5,825,543 A | 10/1998 | Ouderkirk et al. | |
| 5,867,316 A | 2/1999 | Carlson et al. | |
| 5,882,774 A | 3/1999 | Jonza et al. | |
| 6,266,476 B1 | 7/2001 | Shie et al. | |
| 6,322,236 B1 | 11/2001 | Campbell et al. | |
| 6,352,761 B1 | 3/2002 | Hebrink et al. | |
| 6,368,699 B1 | 4/2002 | Gilbert et al. | |
| 6,581,286 B2 | 6/2003 | Campbell et al. | |
| 6,673,425 B1 | 1/2004 | Hebrink et al. | |
| 6,721,102 B2 | 4/2004 | Bourdelais et al. | |
| 6,846,098 B2 | 1/2005 | Bourdelais et al. | |
| 6,871,994 B2 * | 3/2005 | Harada et al. ............... 362/558 |

(Continued)

FOREIGN PATENT DOCUMENTS

JP     2002-055225     2/2002

(Continued)

*Primary Examiner*—Bao Q Truong
(74) *Attorney, Agent, or Firm*—Elizabeth A. Gallo (57) ABSTRACT

Disclosed herein is an optical article having a top layer with a structured surface that collimates light, a core layer secured to the top layer opposite the structured surface, and a bottom layer secured to the core layer opposite the top layer. Either the top layer or the core layer includes a first extrudable polymer having a flexural modulus of greater than 2.5 GPa, and the other layer includes a second extrudable polymer having a flexural modulus of 2.5 GPa or less, an impact strength of greater than about 40 J/m, and tensile elongation at break of greater than about 5%. The bottom layer includes a third extrudable polymer. The bottom layer of the optical article may be structured to diffuse light. One or two optical articles may be secured to an optical film such as a polarizer film. Methods and display devices are also disclosed herein.

42 Claims, 2 Drawing Sheets

U.S. PATENT DOCUMENTS

| | | |
|---|---|---|
| 6,927,900 B2 | 8/2005 | Liu et al. |
| 6,997,566 B2 * | 2/2006 | Hannington ................. 359/614 |
| 7,271,862 B2 * | 9/2007 | Matsunaga et al. ............ 349/64 |
| 7,354,163 B2 * | 4/2008 | Suzuki et al. ................ 359/601 |
| 2001/0013668 A1 | 8/2001 | Neavin et al. |
| 2004/0219338 A1 | 11/2004 | Hebrink et al. |
| 2004/0228141 A1 | 11/2004 | Hay et al. |
| 2005/0024558 A1 | 2/2005 | Toyooka |
| 2006/0084780 A1 | 4/2006 | Hebrink et al. |
| 2006/0093809 A1 | 5/2006 | Hebrink |
| 2006/0103777 A1 | 5/2006 | Ko et al. |
| 2006/0146562 A1 * | 7/2006 | Ko et al. ..................... 362/561 |
| 2006/0146566 A1 | 7/2006 | Ko et al. |
| 2007/0001333 A1 | 1/2007 | Dias et al. |
| 2007/0052118 A1 | 3/2007 | Kudo et al. |
| 2007/0285777 A1 * | 12/2007 | Toyoshima et al. ......... 359/485 |
| 2008/0032146 A1 * | 2/2008 | Toyoshima et al. ......... 428/483 |

FOREIGN PATENT DOCUMENTS

| | | |
|---|---|---|
| JP | 2003-221497 | 8/2003 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 99/36248 | 7/1999 |
| WO | WO 99/36262 | 7/1999 |
| WO | WO 2006-051784 | 5/2006 |

* cited by examiner

OPTICAL ARTICLE AND METHOD OF MAKING

BACKGROUND

This disclosure relates to optical articles that can be used to manage light in display devices. The optical articles have a structured surface and can be made by extrusion methods.

Display devices, such as liquid crystal display (LCD) devices, are used in a variety of applications including computer monitors, televisions, hand-held devices, digital still cameras, video cameras, and the like. LCD devices offer several advantages over traditional display devices that employ cathode ray tubes in that they often weigh less, are smaller, and use less power. An LCD panel is typically backlit by one or more linear or point light sources which are optically coupled to the panel such that images are generated.

The use of optical films in display devices is well known. In the case of backlit display devices, a number of different optical films are often used in order to produce a display with high uniform brightness. For example, diffuser films can be positioned between the light sources and the display panel in order to diffuse light propagating from the light sources such that they are not discernible by a viewer positioned on the opposite side of the panel. Diffuser films, however, can undesirably decrease the overall brightness observed at the display panel. Thus, it is often desirable to utilize a brightness enhancing film which can redirect and recycle light thus providing what is sometimes referred to as optical gain.

There is a need for the development of optical articles suitable for use in display devices and that have improved optical and mechanical properties, yet can be manufactured at low cost.

SUMMARY

An optical article is disclosed herein. In one aspect, the optical article comprises: a top layer having a top structured surface that collimates light; a core layer secured to the top layer opposite the top structured surface; and a bottom layer secured to the core layer opposite the top layer; wherein: either the top layer or the core layer comprises a first extrudable polymer having a flexural modulus of greater than 2.5 GPa as measured according to ASTM D790, and the other layer comprises a second extrudable polymer, the second extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and the bottom layer comprises a third extrudable polymer. The bottom layer of the optical article may comprise a bottom structured surface opposite the core layer, wherein the bottom structured surface diffuses light.

In another aspect, the optical article may have a rough strippable skin layer operatively connected to the top structured surface and/or the bottom structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

A method of making the optical article is also disclosed herein. In one aspect, the method comprises: providing a first extrudable polymer having a flexural modulus greater than 2.5 GPa as measured according to ASTM D790; providing a second extrudable polymer having a flexural modulus of 2.5 GPa or less as measured according to ASTM D790, an impact strength of greater than about 40 J/m as measured according to ASTM D256, and a tensile elongation at break of greater than about 5% as measured according to ASTM D638; providing a third extrudable polymer; coextruding the first, second, and third extrudable polymers to form top, core, and bottom layers, respectively, the core layer secured to the top and bottom layers; and structuring a top surface of the top layer using a molding tool, thereby forming a top structured surface that collimates light. The second, first, and third extrudable polymers may also be coextruded to form top, core, and bottom layers, respectively.

In another aspect, if the optical article comprises a bottom structured surface, then the method may further comprise: structuring a bottom surface of the bottom layer to form a bottom structured surface that diffuses light, wherein structuring comprises: contacting the bottom surface with a molding tool; or operatively connecting a rough strippable skin layer to the bottom surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

Also disclosed herein is an optical body in which the bottom layer of the optical article is secured to an optical film. In one aspect, the optical body comprises a single optical article secured to the optical film, and the optical film may comprise a polarizer film, a reflective polarizer film, a diffuse blend reflective polarizer film, a diffuser film, a brightness enhancing film, a turning film, a mirror film, or a combination thereof. In another aspect, the optical body comprises a second optical article secured to the optical film such that the optical film is secured to the bottom layers of each of the optical articles. In another aspect, the optical body may have a rough strippable skin layer operatively connected to the top structured surface of the optical article and/or the top structured surface of the second optical article.

A method of making the optical body is also disclosed herein. In one aspect, the method comprises securing the optical film to the bottom layer of the optical article. In another aspect, the method comprises: providing a first extrudable polymer having a flexural modulus greater than 2.5 GPa as measured according to ASTM D790; providing a second extrudable polymer having a flexural modulus of 2.5 GPa or less as measured according to ASTM D790, an impact strength of greater than about 40 J/m as measured according to ASTM D256, and a tensile elongation at break of greater than about 5% as measured according to ASTM D638; providing a third extrudable polymer; coextruding the first, second, and third extrudable polymers onto an optical film to form top, core, and bottom layers, respectively, on the optical film, the core layer secured to the top and bottom layers, the optical film secured to the bottom layer opposite the core layer; and contacting the top layer with a molding tool thereby forming a top structured surface that collimates light. The second, first, and third extrudable polymers may also be coextruded to form top, core, and bottom layers, respectively.

A display device comprising any one or more of the above-described optical articles and optical bodies is also disclosed herein. In one aspect, the display device comprises the optical article or optical body disclosed between a display panel and one or more light sources.

The optical article provides a number of advantages. For example, when used in a display device, the optical article can be used to increase light uniformity and brightness at the display panel. The optical article also exhibits minimal, if any, warping over time even when used in the harsh operating conditions of many of today's display devices. Another advantage is that the optical article can be manufactured at high line speeds with few process steps, and can withstand conventional web handling and film cutting methods.

These and other aspects of the invention are described in the detailed description below. In no event should the above summary be construed as a limitation on the claimed subject matter which is defined solely by the claims as set forth herein.

BRIEF DESCRIPTION OF THE DRAWINGS

The invention may be more completely understood in consideration of the following detailed description in connection with the following figures.

DETAILED DESCRIPTION

Disclosed herein is an optical article useful for collimating light passing through the article. The optical article is generally in the form of a film and has a top structured surface. The optical article may be used in any type of display device where brightness is needed, for example, in an LCD device having an LCD panel that is backlit by one or more light sources. In this case, the optical article may be disposed between the one or more light sources and the display panel with the top structured surface facing the display panel. In most cases, the optical article would have an area comparable to that of the display panel. When the optical article is present in a display device, brightness at the display panel increases. The optical article may also be used to diffuse light so that a viewer is less able to discern the shape, size, number, etc. of the light sources as compared to a display device in which the optical article is not used.

The optical article of the present disclosure has a top structured surface that can be made with good cosmetic quality. A top structured surface with good cosmetic quality is necessary for optical purity and viewing uniformity. Diffusion in the optical article is capable of hiding defects in the optical article, hiding defects in other films below the optical article, and mixing light from multiple light sources to improve display light uniformity.

The optical article disclosed herein is also advantageous in that it can exhibit sufficient dimensional stability suitable for use in today's display devices. Dimensional stability is often difficult to provide in that the operating conditions in today's devices can be quite harsh with high temperatures and repeated temperature cycling. Harsh operating environments may include temperatures of up to about 85° C., relative humidities of up to about 90%, and repeated temperature cycling of from about −30° C. to about 85° C. every 1.5 hours for 400 hours. Lack of dimensional stability can result in warping if the article fails to maintain a smooth, flat surface, and wrinkles can also develop which result in shadows being observed at the display panel. In addition to dimensional stability, the optical article must have sufficient toughness so that it can be cut into parts without edge cracking. This minimizes material and operational waste.

The optical article disclosed herein provides yet another advantage in that it can be manufactured using extrusion replication and embossing methods. These methods are advantageous because the optical article can be extruded and replicated at high line speeds, and also because they can be performed simultaneously thus reducing the number of process steps.

The present disclosure teaches one how to manufacture optical articles having a combination of the above advantages. While a variety of optical articles are known in the art, combinations of materials used to make these articles are not suitable for extrusion replication and embossing methods if the articles are to have the requisite structurability and dimensional stability. For example, certain polymers such as polycarbonate have excellent physical properties such as dimensional stability and toughness which is required for web handling during an extrusion process, however, these polymers are difficult to extrusion replicate or emboss with good cosmetic quality at high line speeds. Other polymers such as polystyrenes and polystyrene copolymers can be extrusion replicated or embossed with excellent cosmetic quality yet are difficult to handle due to their brittleness. Styrene acrylonitrile copolymers can be extrusion replicated or embossed with excellent cosmetic quality yet are prone to cracking during die cutting or converting. Brittle polymers in the form of a film often exhibit cracking when flexed, for example, when the film is stored in roll form.

The optical article disclosed herein, having the proper selection of materials and surface structure, provides increased optical gain. The optical article disclosed herein also meets optical requirements for diffusion, measured by haze and clarity, which are necessary for use in today's display devices. By having the properties described above for each of the three layers, optical articles that function as gain diffusers can be made at high line speeds with good replication quality and can be die-cut with little or no delamination of the layers. These advantages lead to increased yields which reduces manufacturing costs.

Figure 1:
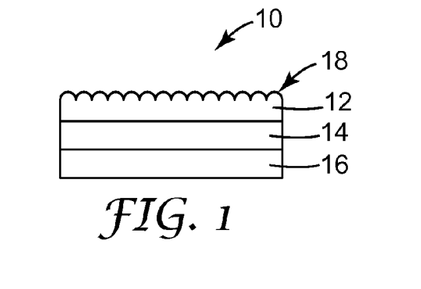
FIGS. 1-4 show cross-sectional views of exemplary optical articles as disclosed herein.

FIG. 1 shows a cross-sectional view of an exemplary optical article disclosed herein. Optical article 10 comprises three layers: core layer 14 disposed between top layer 12 and bottom layer 16. The top layer comprises top structured surface 18 that collimates light. In general, the three layers are coextruded in the form of a film, in a single operational step as described below. As such, the layers are said to be secured to each other in the sense that they are integrally formed as a result of being coextruded. As the film is formed, the top layer is replicated or embossed as described below in order to form the top structured surface. The core layer provides dimensional stability and toughness to the optical article such that the top layer can be made with materials that can be intricately replicated or embossed but perhaps are inferior for web handling and die-cutting. The bottom layer can be designed so that the optical article resists curling, diffuses light, or allows the article to be adhered to another film as described below.

The top layer has a top structured surface that collimates light. That is, for light passing through the article, light that would be transmitted far from normal (perpendicular) to the article is redirected to a more normal (perpendicular) direction to the article. This redirection of light results in an increase in brightness for a given viewing angle, a phenomenon typically referred to as optical gain, or simply "gain". In most cases, the top structured surface will have a topography that provides an optical gain of at least about 1.05.

In some embodiments, the top structured surface is structured such that the optical article diffuses light. The top structured surface is said to diffuse light in that it provides the optical article with the capacity to control the direction of light through the article, and particularly the angular spread of the light, such that uniformity of observed light increases by passing through the article. In general, the top structured surface may have a variety of topographies, depending on the particular application or device in which the optical article is to be used. The top structured surface may have a topography suitable for hiding one or more light sources as described above. The top structured surface can also be designed to hide optical defects such as scratches, lint, etc. in the film, or in other films in the display, or to minimize glare and undesired optical couplings that sometimes occur between components in a display device.

The top structured surface may comprise a plurality of structures having lenticular or prismatic shapes, or a combination thereof. For example, the structures may have hemispherical, ellipsoidal, conical, parabolic, or pyramidal shapes, or combinations thereof. In this case, the structures may have random shapes and sizes. Hybrids of any combination of shapes may also be used, for example, pyramidal prismatic shapes, rectangular-based prismatic shapes, and prismatic shapes having rounded tips. Variable elongated shapes are also useful, as are irregular shapes. Variably sloped lenticular or random columnar shapes are especially useful. A combination of random shapes is also useful.

The dimensions of the structures may also vary. In general, it is desirable for the structures to be large enough such that little or no diffraction is observed, but small enough so that they cannot be seen by an unaided eye. In some embodiments, the structures may have a dimension of from about 1 to about 100 um, for example, from about 5 to about 70 um. The plurality of structures may comprise structures having all the same size, or they may have any number of different sizes, for example, the sizes may be random.

The structures may be disposed on the surface in any number of ways. For example, they may be randomly disposed, arranged in some type of regular pattern, or both. The distance between structures may also vary, for example, the structures may be disposed in close proximity to one another, in substantial contact or immediately adjacent to one another, or some combination. A useful distance between structures is up to about 10 um. The structures may be offset with respect to one another, angularly as well as transversely.

In general, the above variables regarding the shapes, sizes, and placements of the structures are optimized to provide a desired amount of optical gain and, if required, the desired amount of diffusion. For example, a gain of at least about 1.05 is desired, and typically, a minimum amount of diffusion is necessary for hiding optical defects and/or light sources as described above. In some embodiments, the structures have random shapes and sizes, and they may be randomly disposed on the surface. For example, the top structured surface may resemble a roughened or matte surface. In one embodiment, the structures may have lenticular or prismatic shapes or a combination thereof, and the structures may have random sizes and shapes. In another embodiment, the structures may be hemispherical, ellipsoidal, conical, parabolic, or pyramidal shapes, or combinations thereof, and the structures may have random sizes and shapes.

Exemplary structures and top structured surfaces are described in US 2006/0146562 A1; US 2006/0146566 A1; and US 2006/0103777 A1, all incorporated herein by reference. Useful top structured surfaces are also described in US 2006/0146562 A1; US 2006/0146566 A1; and US 2006/0103777 A1, but having a random distribution of both shapes and sizes.

The top layer or the core layer comprises a first extrudable polymer. As used herein, a polymer is considered extrudable if it can be extruded using conventional extrusion means as described below and which are well known in the art. Extrudable polymers typically comprise thermoplastic polymers. The first extrudable polymer has a flexural modulus greater than 2.5 GPa as measured according to ASTM D790. In general, flexural modulus is used as an indication of a material's stiffness when flexed and can be measured according to ASTM D790. A flexural modulus of greater than 2.5 GPa is desired because the resulting films have increased dimensional stability. In some cases, it may be desired that the flexural modulus be greater than about 3 GPa because the optical articles will have even greater dimensional stability. The force required to bend or warp a film article is dependant on flexural modulus, which can be a function of a polymer's type and molecular weight.

The following equation illustrates the dependence of film buckling force on flexural modulus:

$$\text{Critical Buckling Force} = (E * H^3 * W * \pi^2)/L^2$$

Where:
E=Flexular Modulus
H=thickness
W=width
L=Length

The materials used in the top layer can be selected depending on the particular topography of the top structured surface that is to be imparted. In general, the materials are selected such that the structure is fully replicated before the materials solidify or freeze. This will depend in part on the temperature at which the material is held during the extrusion process and the temperature of the tool used to impart the top structured surface, as well as on the speed at which coextrusion is being carried out. Typically, the extrudable polymer used in the top layer has a Tg of less than about 140° C., or a Tg of from about 85 to about 120° C., in order to be amenable to coextrusion replication and embossing under most operating conditions. That is, if the top layer comprises the first extrudable polymer, then the first extrudable polymer has a Tg of less than about 140° C., or a Tg of from about 85 to about 120° C. Likewise, if the top layer comprises the second extrudable polymer, then the second extrudable polymer has a Tg of less than about 140° C., or a Tg of from about 85 to about 120° C. Other properties such as molecular weight and melt viscosity should also be considered and will depend upon the particular polymer or polymers used. The materials used in the top layer should also be selected so that they provide good adhesion to the core layer so that delamination of the two layers is minimized during the lifetime of the optical article.

Useful polymers that may be used as the first extrudable polymer include one or more polymers selected from the group consisting of styrene acrylonitrile copolymers; styrene (meth)acrylate copolymers; polymethylmethacrylate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; and copolymers of acrylonitrile, butadiene, and styrene. Particularly useful polymers that may be used as the first extrudable polymer include styrene acrylonitrile copolymers known as TYRIL copolymers available from Dow Chemical; examples include TYRIL 880 and 125. Other particularly useful polymers that may be used as the first extrudable polymer include styrene maleic anhydride copolymer DYLARK 332 and styrene acrylate copolymer NAS 30, both from Nova Chemical. Also useful are polyethylene terephthalate blended with nucleating agents such as magnesium silicate, sodium acetate, or methylenebis(2,4-di-t-butylphenol) acid sodium phosphate.

In some embodiments, it is desirable for the top skin layer to have high refractive indices for increased collimation of light, for example, greater than about 1.59 as measured at 630 nm. Polymers with higher refractive indices will provide increased refraction of light, and with certain surface geometries increased recycling of high angle light, and thus increased gain or normal angle brightness. Exemplary polymers with high refractive indices useful as the top skin layer include CoPENs (copolymers of polyethylenenaphthalate), CoPVN (copolymers of polyvinylnaphthalene) and polyimides including polyetherimide.

Additional materials may be used in the top layer depending on the desired effect. In general, any materials added to the top layer are desirably transparent or translucent so as to maximize the amount of light scattered in the forward direction. For example, the top layer may comprise a polymeric composite with fiber or particulate reinforcements so as to increase the flexural modulus of the layer; fibers, spheres, nanoparticles, or a combination thereof are examples of such materials.

The bottom layer comprises a third extrudable polymer which can be selected depending on the properties desired for the layer. For example, the third extrudable polymer may be selected to provide balance such that the optical article resists curling and/or can be easily handled. In this case, it may be desirable for the third extrudable polymer to be the same as the extrudable polymer used in the top layer, or at least have the same properties as the extrudable polymer used in the top layer. For example, it may be desirable for the third extrudable polymer to have a flexural modulus of greater than 2.5 GPa as measured according to ASTM D790, if the top layer comprises the first extrudable polymer. In some embodiments, the top layer can comprise the first extrudable polymer, and the first and third extrudable polymers are the same. In other embodiments, the top layer can comprise the second extrudable polymer, and the second and third extrudable polymers are the same.

Figure 2:
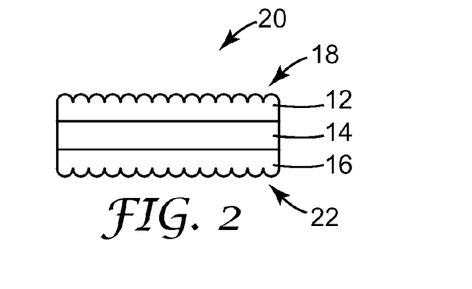

The third extrudable polymer may also be selected such that the bottom surface, opposite the core layer, can comprise a bottom structured surface that diffuses light. This embodiment is shown in FIG. 2: optical article 20 comprises core layer 14 disposed between top and bottom layers, 12 and 16, respectively. The bottom layer comprises bottom structured surface 22 which may or may not be the same as top structured surface 18. For example, it may be desirable for bottom structured surface 22 to provide less diffusion than top structured surface 18; this would be desirable when increased collimation of light is desired. For another example, it may be desirable for bottom structured surface 22 to decollimate light less than top structured surface 18 collimates light.

If the bottom layer comprises a bottom structured surface, the materials can be selected depending on the particular topography of the bottom structured surface that is to be imparted. In general, the materials are selected such that the structure is fully replicated before the materials solidify or freeze. This will depend in part on the temperature at which the material is held during the extrusion process and the temperature of the tool used to impart the structured surface, as well as on the speed at which coextrusion is being carried out. The third extrudable polymer needs to be amenable to coextrusion replication and embossing under most operating conditions. Other properties such as molecular weight and melt viscosity should also be considered and will depend upon the particular polymer or polymers used. The third extrudable polymer can also be selected such that the bottom layer can function as an adhesive layer or tie layer so that the optical article can be adhered to another film.

Useful polymers that may be used as the third extrudable polymer include one or more polymers selected from the group consisting of styrene acrylonitrile copolymers; styrene (meth)acrylate copolymers; styrene maleic anhydride copolymers, nucleated semi-crystalline polyesters; polystyrenes; syndiodactic polystyrene; polystyrene and polyphenylene oxide blends; blends of styrene-acrylonitrile copolymers; styrene-acrylonitrile and polycarbonate blends; copolymers of acrylonitrile, butadiene, and styrene; and copolymers thereof. Particular examples include any of the aforementioned materials. The third extrudable polymer may also comprise one or more polymers selected from the group consisting of polyesters, functionally-modified polyolefins, and polyurethanes. Useful polyesters include copolyesters and particularly copolymers of polyethylenenaphthalate which are specifically derived from naphthalene dicarboxylic acid monomers.

If the bottom layer functions as a tie layer, then the third extrudable polymer can comprise a polyester, for example, PETG 6763 from Eastman Chemical. Additional suitable polymers useful as for tie layers include functional modified polyolefins such as ADMER SE810 and ADMER AT 1614A from Mitsui Chemicals, and BYNEL E418 and FUSABOND E-556D from Dupont. Hot melt extrudable adhesives such as VITEL 1200 copolyester and VITEL 4240 copolyamide from Bostik can also be used in the bottom layer. Other adhesive polymers useful as the tie layer are VITEL 7119M polyurethane from Bostik and PURHMA reactive hot melt adhesive from Eastman Chemical.

It may be desirable for the top and bottom structured surfaces to be the same, or they may be different from one another. For example, the following combinations of structure surfaces may be desirable: the top and bottom structured surfaces comprise convex structures, the top structured surface comprises convex structures and the bottom surface concave structures, and the top structured surface comprises concave structures and the bottom surface convex structures.

The second extrudable polymer has a combination of properties: a flexural modulus of 2.5 GPa or less as measured according to ASTM D790, an impact strength of greater than about 40 J/m as measured according to ASTM D256, and tensile elongation at break of greater than about 5% as measured according to ASTM D638. Flexural modulus, as described above, is a measure of a material's stiffness when flexed. Having either the top layer or the core layer comprise a polymer having a flexural modulus of 2.5 GPa or less as measured according to ASTM D790, the optical article can be flexed, bent, rolled, slit, die-cut, etc. without cracking, even though the layer as a stand alone article may exhibit cracking. The flexural modulus is desirably low enough such that when the optical article is die-cut, the top and/or bottom layers exhibit little or no cracking.

Impact strength and ductility impart toughness to the top layer or core layer such that the optical article exhibits sufficient dimensional stability as described above yet can also withstand conventional web handling and film cutting methods. In general, toughness is the ability of a material to deform plastically and to absorb energy before fracture. Ductility is a measure of how much something deforms plastically before fracture, but just because a material is ductile does not make it tough. The key to toughness is a combination of high strength and high ductility: strength allows the polymer to withstand plastic deformation without fracture, and ductility allows the polymer to deform plastically so that the optical article can withstand conventional web handling and film cutting methods.

In particular, it is desirable for the second extrudable polymer to have an impact strength of greater than about 40 J/m as measured according to ASTM D256 which is sometimes referred to as Izod Pendulum Impact Resistance. In general, it is desirable for the second extrudable polymer to have an impact strength as high as possible, for example, greater than about 100 J/m. If the impact strength is less than about 40 J/m, then the optical article is more likely to crack during web handling and die cutting. In general, it is desirable for the second extrudable polymer to have a tensile elongation at break as high as possible. It is also desirable to have a tensile elongation at break of greater than about 5% as measured according to ASTM D638, and in some embodiments, greater than about 10%, or greater than 25%. If the tensile elongation at break is less than about 5%, then the optical article is more likely to crack during web handling and die cutting. The second extrudable polymer can also be selected so that adjacent layer(s) have good adhesion in order to minimize delamination of the layers during the lifetime of the optical article.

Useful polymers that may be used as the second extrudable polymer include one or more polymers selected from the group consisting of polycarbonates; polyesters; blends of polycarbonates and polyesters; copolymers of styrene; copolymers of acrylonitrile, butadiene, and styrene; block copolymers of styrene with alkene-polymerized midblocks; acid and/or anhydride functionalized polyolefins; and copolymers of polyethylene and polypropylene. Examples of useful blends are a blend of polycarbonates and copolyesters known as SA 115 from Eastman Chemical and XYLEX 7200 from GE Plastics. Copolymers of acrylonitrile, butadiene, and styrene may include copolymers prepared by polymerizing styrene and acrylonitrile in the presence of polybutadiene. The proportions can vary from 15% to 35% acrylonitrile, 5% to 30% butadiene and 40% to 60% styrene. The result is a long chain of polybutadiene criss-crossed with shorter chains of poly(styrene-co-acrylonitrile). Block copolymers of styrene with alkene-polymerized midblocks include those available as KRATON G copolymers from Kraton Polymers. KRATON G polymers are styrenic block copolymers with a hydrogenated midblock of styrene-ethylene/butylene-styrene or styrene-ethylene/propylene-styrene.

Additional materials may be used in the core layer depending on the desired effect. In general, any materials added to the core layer are desirably transparent or translucent so as to maximize the amount of light scattered in the forward direction. For example, the core layer may comprise a polymeric composite with fibers, spheres, nanoparticles, or a combination thereof.

Additions such as UV absorbers, hindered amine light stabilizers, and anti-oxidants may be blended into any of the layers formed by extrusion. These additives may be used for protection from degradation, especially degradation from UV light. Examples of useful UV absorbers include TINUVIN 1577, TINUVIN 327, and CGL 139 from Ciba Specialty Chemicals. Examples of useful hindered amine light stabilizers include TINUVIN 622 from Ciba Specialty Chemicals and LOWILITE 62 and 94 from Great Lakes Chemicals. Examples of useful anti-oxidants include ULTRANOX 627 and IRGANOX 1010 from Ciba Specialty Chemicals.

The total thickness of the optical article may vary depending on the particular display device in which it is used. The optical article needs to be thin enough so that it can be incorporated into the device, however, it also needs to be thick enough so that sufficient warp resistance is obtained which, in turn, depends upon the particular operating conditions inside the display device. A useful range of thicknesses for the optical article is from about 0.5 um to about 500 um, or from about 5 um to about 250 um.

The three layers depicted in FIG. 1 are shown as having approximately the same thickness, however, the layers can be constructed with any combination of thicknesses. The minimum thinness of a given layer is often a function of the materials used to form the layer in combination with the extrusion conditions: the material must be extruded at a minimum thickness such that flow instabilities are minimized. The thicknesses of the top and bottom layers are typically from about 0.5 um to 250 um, or from about 1 um to about 150 um. The core layer in particular must be thick enough so that when die-cut, little or no delamination of the layers is observed. A useful range for the thickness of the core layer is from about 10 um to about 250 um, from about 10 um to about 125 um, or from about 10 um to about 50 um. Material costs should also be considered: it may be desirable to use thinner layers of more expensive materials in combination with thicker layers of less expensive materials.

Figure 3:
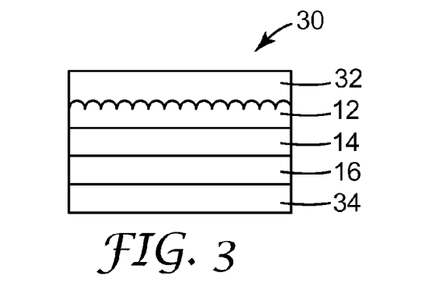

The optical article may further comprise a rough strippable skin layer operatively connected to the top structured surface or the bottom surface, or both. FIG. 3 shows exemplary optical article 30 having core layer 14 disposed between top and bottom layers, 12 and 16, respectively; rough strippable skin layers, 32 and 34, are operatively connected to the top structured surface and the bottom surface, respectively. In general, a rough strippable skin layer is operatively connected to a surface such that it remains adhered to the optical article during initial processing, slitting, die cutting, storage, handling, packaging, transporting, and subsequent processing, or it can be stripped or removed before or after any of these steps. For example, a rough strippable skin layer can be removed immediately prior to installation in a display device. Rough strippable skin layers are described in US 2006/0093809 A1, the disclosure of which is incorporated herein by reference.

Figure 4:
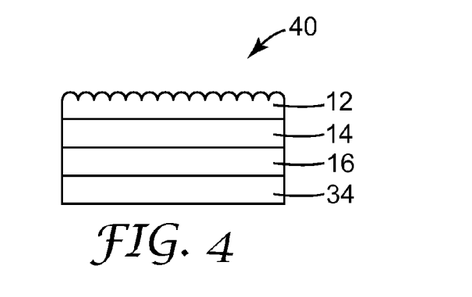

FIG. 4 shows exemplary optical article 40 having core layer 14 disposed between top and bottom layers, 12 and 16, respectively; rough strippable skin layer 34 is operatively connected to the bottom surface of the bottom layer. In this embodiment, the rough strippable skin layer is operatively connected to the bottom structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

Another exemplary optical article has a rough strippable skin layer operatively connected to the top structured surface. In this embodiment, the rough strippable skin layer is operatively connected to the top structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

For the optical article shown in FIG. 3, the optical comprises: a first rough strippable skin layer operatively connected to the top structured surface, the first rough strippable skin layer comprising a first continuous phase and a first disperse phase, the first continuous phase comprising a first continuous phase polymer, and the first disperse phase comprising first particles or a first disperse phase polymer, the first disperse phase polymer being immiscible with the first continuous phase polymer; and a second rough strippable skin layer operatively connected to the bottom structured surface, the second rough strippable skin layer comprising a second continuous phase and a second disperse phase, the second continuous phase comprising a second continuous phase polymer, and the second disperse phase comprising second particles or a second disperse phase polymer, the second disperse phase polymer being immiscible with the second continuous phase polymer.

The materials used in the rough strippable skin layer can be selected to provide a certain amount of adhesion to the surface with which the rough strippable skin layer is operatively connected. For example, it is often useful for the peel force to be at least about 2 g/in to about 120 g/in, although the peel force can be greater than 120 g/in depending on the application and how it will be removed.

As described above, the rough strippable skin layer comprises a continuous phase and a disperse phase in which the continuous phase is a continuous phase polymer, and the disperse phase is particles or a disperse phase polymer immiscible with the continuous phase polymer. The materials may be selected such that the operatively connective surface is rough and/or comprises a plurality of structures. This surface can then be used to impart roughness or structure to the surface of the optical article. For example, the rough strippable skin layer may comprise a rough surface which is operatively connected to the bottom surface of the optical article such that the rough surface imparts roughness to the bottom surface. For another example, the rough strippable skin layer may comprise a plurality of protrusions or convex structures on the operatively connected surface such that the surface imparts a plurality of concave structures to the top and/or bottom surface of the optical article.

Materials suitable for use as the continuous phase polymer include polymers having low melting and low crystallinity properties, or they may be amorphous. Examples include polyolefins; syndiotactic polypropylene, random copolymer of propylene and ethylene, polyesters, styrene acrylonitrile, medium density polyethylene, modified polyethylene, polycarbonate and polyester blends, propylene random copolymer, or any of their copolymers, or some combination thereof. Materials suitable for use as the disperse phase polymer include polymers immiscible with the continuous phase polymer, such as polymers having a higher degree of crystallinity than that of the continuous phase polymer. Suitable disperse phase polymers include styrene acrylonitrile, polyethylene, polypropylene, copolymers of polyethylene and polypropylene, polycarbonate, polyester, and polycaprolactone polymers. Examples of two different polymers that can be used in the rough strippable skin layer include e-caprolactone polymer blended with syndiotactic polypropylene, polypropylene copolymer blended with polyethylene octene copolymer, syndiotactic polypropylene with high density polyethylene, syndiotactic polypropylene with low density copolyethylene, random copolymer of propylene and ethylene with high density polyethylene, and syndiotactic polypropylene with linear low density polyethylene. Examples of particles suitable for use as the disperse phase include silica, talc, sodium benzoate, calcium carbonate, glass spheres, ceramic spheres, or a combination thereof. Polymeric and cross-linked polymeric particles may also be used.

The rough strippable skin layers can be extruded onto the optical article either during or after the top, core, and bottom layers are extruded to form the optical article. They can also be applied by coating, casting, or lamination.

The optical article is optically transmissive so that it is highly efficient at transmitting light. In some embodiments, the optical article has a birefringence, both in-plane and out-of-plane, of less than about 0.05, less than about 0.01, or less than about 0.005 so that the polarization of the light is not undesirably rotated.

The optical article disclosed herein may be formed by coextrusion of the extrudable polymers. Extrusion conditions are chosen to adequately feed, melt, mix, and pump the extrudable polymers as feed streams or melt streams in a continuous and stable manner. Temperatures used to form and maintain each of the melt streams are chosen to be within a range that reduces freezing, crystallization, or unduly high pressure drops at the low end of the range, and that reduces degradation at the high end. Preferably, the polymers of the first optical layers, the second optical layers, and the optional non-optical layers are chosen to have similar rheological properties (e.g., melt viscosities) so that they can be co-extruded without flow disturbances.

Each feed stream is conveyed through a neck tube into a gear pump used to regulate the continuous and uniform rate of polymer flow. A static mixing unit may be placed at the end of the neck tube to carry the melt streams from the gear pump into a feedblock with uniform melt stream temperature. The entire melt stream is typically heated as uniformly as possible to enhance both uniform flow of the melt stream and reduce degradation during melt processing.

If top and bottom layers comprise the same material, a multilayer feedblock may be used to divide the extrudable polymer into two melt streams, one for each of the top and bottom layers. The layers from any melt stream are created by sequentially bleeding off part of the stream from a main flow channel into side channel tubes which lead to layer slots in the feedblock manifold. The layer flow is often controlled by choices made in machinery, as well as the shape and physical dimensions of the individual side channel tubes and layer slots.

The downstream-side manifold of the feedblock is often shaped to compress and uniformly spread the layers of the combined multilayer stack transversely. The multilayer stack exiting the feedblock manifold may then enter a final shaping unit such as a single manifold die. The resulting web is then cast onto a chill roll, sometimes referred to as a casting wheel or casting drum. This casting is often assisted by the use of a nip roll. In general, the web is cast to a uniform thickness across the web but deliberate profiling of the web thickness may be induced by die lip controls. Alternatively, a multi-manifold extrusion die may be used to spread and combine the layers prior to casting.

After cooling, the optical article can be subsequently processed, such as by cutting into parts such as sheets that can be stacked.

The structured surface described above is made by contacting the surface of the top layer with a molding tool. This step may be carried out either immediately after extrusion of the top layer or at a later time in a separate step. The structured surface can be made from any contacting technique such as casting, calendering, coating, belt casting, or compressing techniques. More particularly, the structured surface can be formed by a tool having a structured surface that is the inverse of the structured surface desired for the optical article. The topography of the tool can be formed by any number of techniques which can be selected depending upon the tool material and features. Illustrative techniques include etching, for example, chemical etching or reactive-ion etching, or other means such as laser ablation, engraving, bead blasting, sandblasting, photolithography, stereolithography, micromachining, knurling, scoring, cutting, etc.

In one embodiment, a method of making the optical article comprises: providing a first extrudable polymer having a flexural modulus greater than 2.5 GPa as measured according to ASTM D790; providing a second extrudable polymer having a flexural modulus of 2.5 GPa or less as measured according to ASTM D790, an impact strength of greater than about 40 J/m as measured according to ASTM D256, and a tensile elongation at break of greater than about 5% as measured according to ASTM D638; providing a third extrudable polymer; coextruding the first, second, and third extrudable polymers to form top, core, and bottom layers, respectively, the core layer secured to the top and bottom layers; and structuring a top surface of the top layer using a molding tool, thereby forming a top structured surface that collimates light. The top surface may also be structured by operatively connecting a rough strippable skin layer thereto.

In another embodiment, the above method may further comprise: structuring a bottom surface of the bottom layer to form a bottom structured surface that diffuses light, wherein structuring comprises: contacting the bottom surface with a molding tool; or operatively connecting a rough strippable skin layer to the bottom surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

In another embodiment, a method of making the optical article may comprise: providing a first extrudable polymer having a flexural modulus greater than 2.5 GPa as measured according to ASTM D790; providing a second extrudable polymer having a flexural modulus of 2.5 GPa or less as measured according to ASTM D790, an impact strength of greater than about 40 J/m as measured according to ASTM D256, and a tensile elongation at break of greater than about 5% as measured according to ASTM D638; providing a third extrudable polymer; coextruding the second, first, and third extrudable polymers to form top, core, and bottom layers, respectively, the core layer secured to the top and bottom layers; and structuring a top surface of the top layer using a molding tool, thereby forming a top structured surface that collimates light. The top surface may also be structured by operatively connecting a rough strippable skin layer thereto.

In another embodiment, the above method may comprise: structuring a bottom surface of the bottom layer to form a bottom structured surface that diffuses light, wherein structuring comprises: contacting the bottom surface with a molding tool; or operatively connecting a rough strippable skin layer to the bottom surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

Figure 5:
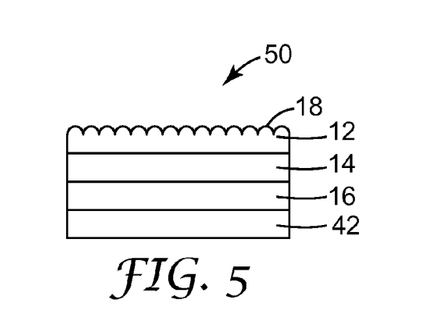
FIGS. 5-12 show cross-sectional views of exemplary optical bodies as disclosed herein.

FIG. 5 shows a cross-sectional view of optical body 50 disclosed herein, wherein optical film 42 is secured to a bottom surface of bottom layer 16. Various types of optical films may be used. The optical films may be multilayer optical films composed of some combination of all birefringent optical layers, some birefringent optical layers, or all isotropic optical layers. They can have ten or less layers, hundreds, or even thousands of layers. Multilayer optical films are used in a wide variety of applications. For example, reflective polarizers and mirrors can be used in LCD devices to enhance brightness, and/or reduce glare at the display panel. The optical film may also be a polarizer which can be used in sunglasses to reduce light intensity and glare. The optical film may comprise a polarizer film, a reflective polarizer film, a diffuse blend reflective polarizer film, a diffuser film, a brightness enhancing film, a turning film, a mirror film, or a combination thereof.

Useful optical films include commercially available optical films marketed as Vikuiti™ Dual Brightness Enhanced Film (DBEF), Vikuiti™ Brightness Enhanced Film (BEF), Vikuiti™ Diffuse Reflective Polarizer Film (DRPF), Vikuiti™ Enhanced Specular Reflector (ESR), Vikuiti™ Advanced Polaring Film (APF), all available from 3M Company. Useful optical films are also described in U.S. Pat. Nos. 5,825,543; 5,867,316; 5,882,774; 6,352,761 B1; 6,368,699 B1; 6,927,900 B2; U.S. 2006/0084780 A1; 2001/0013668 A1; U.S. Ser. No. 09/229,724; WO 95/17303; WO 95/17691; WO95/17692; WO 95/17699; WO 96/19347; WO 97/01440; WO 99/36248; and WO99/36262; all incorporated herein by reference. These optical films are merely illustrative and are not meant to be an exhaustive list of suitable optical films that can be used.

The optical film may have one or more non-optical layers, i.e., layers that do not significantly participate in the determination of the optical properties of the optical film. The non-optical layers may be used to impart or improve mechanical, chemical, optical, etc. any number of additional properties as described in any of the above references; tear or puncture resistance, weatherability, solvent resistance.

In one embodiment, the optical body described above may further comprise a rough strippable skin layer operatively connected to the top structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

Figure 6:
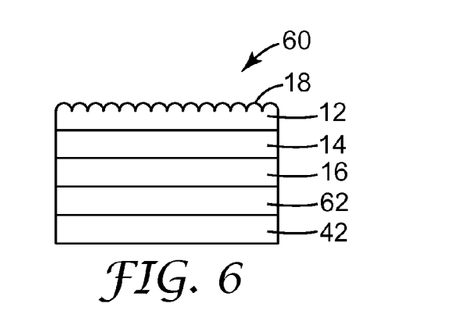

The optical body shown in FIG. 5 may be made providing the optical article disclosed herein; providing an optical film; and securing the optical film to the bottom layer opposite the core layer. Securing may be carried out by laminating, for example, if the bottom layer comprises a tie layer or if a tie layer is present on the surface of the optical film that is to be secured to the bottom layer. Securing may also be carried out by applying an adhesive to either the bottom layer or the optical film and then laminating the optical article and the optical film together to form the optical body. This embodiment is shown in FIG. 6 with optical body 60 comprising adhesive layer 62 disposed between bottom layer 16 and optical film 42. The adhesive layer could comprise a transparent hot melt adhesive that may be extruded onto the bottom layer either during or after coextrusion of the three layers which form the optical article. A transparent hot melt adhesive could also be extruded onto the optical film or coextruded with the optical film. The adhesive layer could also comprise a pressure sensitive adhesive or a curable adhesive such as a UV-curable adhesive.

The optical body shown in FIG. 5 may also be made by coextruding the three layers which form the optical article directly onto the optical film. That is, a method of forming the optical body may comprise: providing a first extrudable polymer having a flexural modulus greater than 2.5 GPa as measured according to ASTM D790; providing a second extrudable polymer having a flexural modulus of 2.5 GPa or less as measured according to ASTM D790, an impact strength of greater than about 40 J/m as measured according to ASTM D256, and a tensile elongation at break of greater than about 5% as measured according to ASTM D638; providing a third extrudable polymer; coextruding the first, second, and third extrudable polymers onto an optical film to form top, core, and bottom layers, respectively, on the optical film, the core layer secured to the top and bottom layers, the optical film secured to the bottom layer opposite the core layer; and contacting the top layer with a molding tool thereby forming a structured surface that collimates light. The top surface may also be structured by operatively connecting a rough strippable skin layer thereto.

The optical body shown in FIG. 5 may also be made by coextruding the three layers which form the optical article directly onto the optical film. That is, a method of forming the optical body may comprise: providing a first extrudable polymer having a flexural modulus greater than 2.5 GPa as measured according to ASTM D790; providing a second extrudable polymer having a flexural modulus of 2.5 GPa or less as measured according to ASTM D790, an impact strength of greater than about 40 J/m as measured according to ASTM D256, and a tensile elongation at break of greater than about 5% as measured according to ASTM D638; providing a third extrudable polymer; coextruding the second, first, and third extrudable polymers onto an optical film to form top, core, and bottom layers, respectively, on the optical film, the core layer secured to the top and bottom layers, the optical film secured to the bottom layer opposite the core layer; and contacting the top layer with a molding tool thereby forming a structured surface that collimates light. The top surface may also be structured by operatively connecting a rough strippable skin layer thereto.

Figure 7:
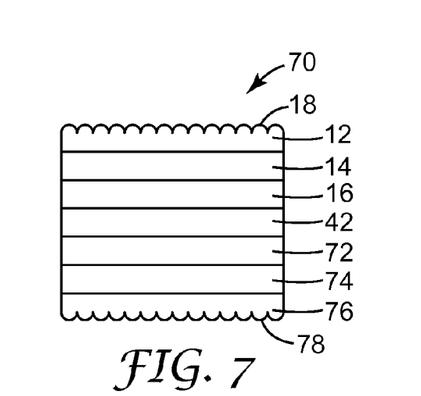

Another embodiment disclosed herein is that of optical body 70 shown in FIG. 7. In this embodiment, optical film 42 is secured to the bottom surface of bottom layer 16 and second bottom layer 72. Adjacent second bottom layer is second core layer 74 and second top layer 76 having second top structured surface 78. This optical body comprises: a first optical article comprising: a first top layer 12 having a first top structured surface 18 that collimates light; a first core layer 14 secured to the first top layer opposite the first top structured surface; and a first bottom layer 16 secured to the first core layer opposite the first top layer; wherein: either the first top layer or the first core layer comprises a first extrudable polymer having a flexural modulus of greater than 2.5 GPa as measured according to ASTM D790, and the other layer comprises a second extrudable polymer, the second extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and the first bottom layer comprises a third extrudable polymer; a second optical article comprising: a second top layer 76 having a second top structured surface 78 that diffuses light; a second core layer 74 secured to the second top layer opposite the second top structured surface; and a second bottom layer 72 secured to the second core layer opposite the second top layer; wherein: either the second top layer or the second core layer comprises a fourth extrudable polymer having a flexural modulus of greater than 2.5 GPa as measured according to ASTM D790, and the other layer comprises a fifth extrudable polymer, the fifth extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and the second bottom layer comprises a sixth extrudable polymer; and an optical film 42 secured to the first and second bottom layers, the optical film comprising a polarizer film, a reflective polarizer film, a diffuse blend reflective polarizer film, a diffuser film, a brightness enhancing film, a turning film, a mirror film, or a combination thereof.

A rough strippable skin layer may be operatively connected to the first top structured surface 18, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

Figure 8:
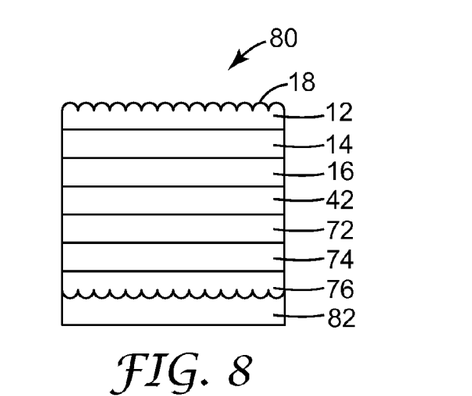

A rough strippable skin layer may be operatively connected to the second top structured surface 76 as shown in FIG. 8; the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

Rough strippable skin layers may be operatively connected to both the first and second structured surfaces, 18 and 78, respectively, such that the optical body comprises: a first rough strippable skin layer operatively connected to the first top structured surface, the first rough strippable skin layer comprising a first continuous phase and a first disperse phase, the first continuous phase comprising a first continuous phase polymer, and the first disperse phase comprising first particles or a first disperse phase polymer, the first disperse phase polymer being immiscible with the first continuous phase polymer; and a second rough strippable skin layer operatively connected to the second top structured surface, the second rough strippable skin layer comprising a second continuous phase and a second disperse phase, the second continuous phase comprising a second continuous phase polymer, and the second disperse phase comprising second particles or a second disperse phase polymer, the second disperse phase polymer being immiscible with the second continuous phase polymer.

Figure 9:
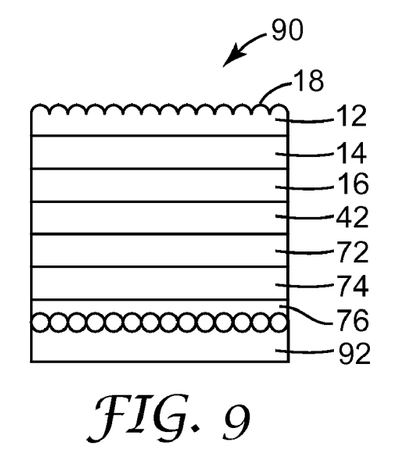
Figure 10:
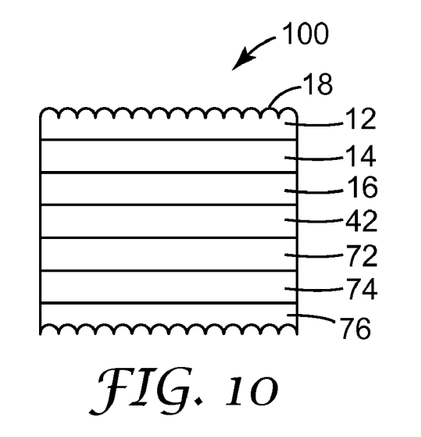

FIG. 9 shows exemplary optical body 90 comprising rough strippable skin layer 92 operatively connected to second top layer 76. First top structured surface 18 comprises a plurality of convex structures. Rough strippable skin layer 92 comprises a plurality of protrusions. FIG. 10 shows an exemplary optical body 100 wherein rough strippable skin layer 92 is removed such that the second top structured surface is structured with a plurality of concave structures.

Figure 11:
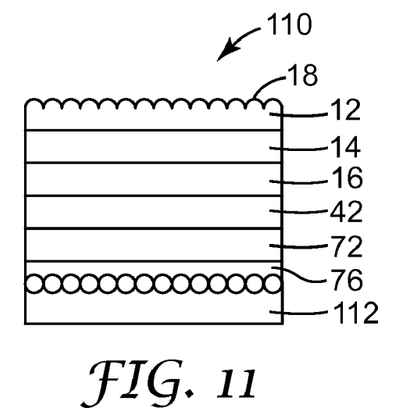

Another embodiment disclosed herein is that of an optical body 110 as shown in FIG. 11. In this embodiment, optical film 42 is secured to the bottom surface of bottom layer 16 and second bottom layer 72. Adjacent second bottom layer is second top layer 76 which may comprise either the fourth or fifth extrudable polymer as described above. This optical body comprises: a first optical article comprising: a first top layer 12 having a first top structured surface that collimates light; a first core layer 14 secured to the first top layer opposite the first top structured surface; and a first bottom layer 16 secured to the first core layer opposite the first top layer; wherein: either the first top layer or the first core layer comprises a first extrudable polymer having a flexural modulus of greater than 2.5 GPa as measured according to ASTM D790, and the other layer comprises a second extrudable polymer, the second extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and the first bottom layer comprises a third extrudable polymer; a second optical article comprising: a second top layer 76 having a second top structured surface that diffuses light; and a second bottom layer 72 secured to the second top layer opposite the second top structured surface; wherein: the second top layer comprises either: a fourth extrudable polymer having a flexural modulus of greater than 2.5 GPa as measured according to ASTM D790, or a fifth extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and the second bottom layer comprises a sixth extrudable polymer; and optical film 42 secured to first and second bottom layers, 16 and 72, respectively, the optical film comprising a polarizer film, a reflective polarizer film, a diffuse blend reflective polarizer film, a diffuser film, a brightness enhancing film, a turning film, a mirror film, or a combination thereof. A rough strippable skin layer may be operatively connected to the first top structured surface, the second top structured surface, or both.

Figure 12:
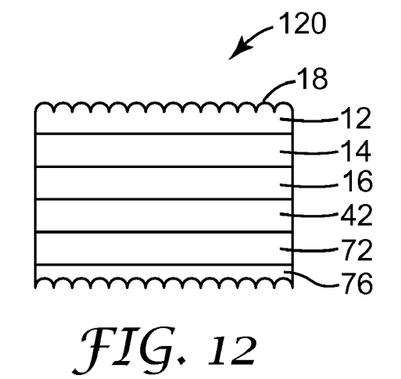

In the particular embodiment shown in FIG. 11, exemplary optical body 110 comprises rough strippable skin layer 112 operatively connected to second top layer 76 and first top structured surface 18 comprises a plurality of convex structures. Rough strippable skin layer 112 also comprises a plurality of protrusions. FIG. 12 shows an exemplary optical body 120 wherein rough strippable skin layer 112 is removed such that the second top structured surface is structured with a plurality of concave structures.

An optical body comprising two optical articles may be prepared by extruding the any of the layers onto the optical film as described above, or by securing an already made optical article onto the optical film. For example, an optical body comprising two optical articles may be prepared by simultaneously extruding the layers of the first and second optical articles onto the optical film. Alternatively, any of the layers may be extruded in some sequence, for example, the layers used to form the first optical article may be extruded onto the optical film, and at some later time, the layers used to form the second optical article extruded onto the other side of the optical film. It is also possible that the layers used to form the first optical article may be extruded onto the optical film, and at some later time, the second optical article secured to the other side of the optical film as described above.

For an optical body comprising two optical articles, the optical body may be asymmetrical in any number of ways. That is, the top layers may have different thicknesses, the core layers may have different thicknesses, and/or bottom layers may have different thicknesses. Likewise, the first and fourth extrudable polymers may be different, the second and fifth extrudable polymers may be different, and/or the third and sixth extrudable polymers may be different. In general, the particular combination of layers used may be selected depending on the desired property, function, etc. that is intended for the optical body. For example, the combination of layers may be selected in order to induce warping of the optical body. Materials useful as the fourth, fifth, and sixth extrudable polymers include those described above for the first, second, and third extrudable polymers, respectively. The structured surfaces may be the same or different. For example, the second top structured surface may provide more diffusion as compared to the first top structured surface. If the structured surfaces are different, then they may be formed in different ways, for example, the first top structured surface may be structured immediately after coextrusion and by using a molding tool in the form of a roller, and the second top structured surface may be structured at a later time by embossing with a roller or stamp.

The invention may be more completely understood in consideration of the following examples.

EXAMPLES

Test Methods

Haze and Clarity

The films were measured for haze and clarity using a Hazeguard® Plus Hazemeter (from BYK-Gardner USA). Haze was measured according to ASTM D-1003 and clarity according to the test methods described in the manual for the instrument.

Gain

Increases in brightness were measured using a "gain tester" designed to simulate measured increases in brightness for a liquid crystal display. The gain tester was fabricated using a spot photometer and a suitable backlight with a polarizer placed between the two so that only one polarization of light from the backlight was measured by the photometer. Suitable spot photometers include the Minolta LS-100 and LS-110. The backlight was obtained from Landmark and the polarizer was a high contrast display polarizer which was oriented so that the pass axis of the polarizer was aligned with the long axis of the backlight. The sample film was inserted into the tester so that the pass axis of the sample was aligned with the pass axis of the high contrast polarizer. The sample was made large enough to cover the entire backlight. The increase in brightness, or gain, was measured as the ratio of the brightness of the gain tester with the polarizing film to the brightness of the gain tester without the polarizing film.

Warpage Test

Films were tested for warpage by placing them in a thermal shock chamber (Model SV4-2-2-15 Environmental Test Chamber from Envirotronics, Inc.) and subjecting them to 96 cycles, each cycle consisting of one hour at 85° C. followed by one hour at −35° C. The film is then removed from the chamber and inspected for wrinkles. Warpage is considered unacceptable when there are many deep wrinkles across the surface of the film. When there are few shallow wrinkles or the film appears smooth, warpage is generally considered acceptable.

Comparative Example

A reflective polarizer (DBEF) was made from alternating layers of PEN and CoPEN5545HD (containing 55 mol % naphthalene dicarboxylate and 45 mol % dimethyl terephthalate as dicarboxylate comonomers, and 95.8 mol % ethylene glycol, 4 mol % 1,6 hexanediol, 0.2 mol % trimethylol propane as hydroxyl comonomers) was preheated to 65° C. with infrared heat just prior to a nip between a rubber roll and a matte finished casting wheel. A CoPEN5545HD adhesive layer and a styrene acrylonitrile (TYRIL 880 from Dow Chemical) high modulus layer were coextrusion coated onto the DBEF and into the nip at 7.5 feet per minute. These polymers were coextruded at 271° C. with thicknesses of 0.5 mils CoPEN5545HD adhesive tie-layer and 6 mils TYRIL 880 high modulus layer. The TYRIL 880 high modulus layer was pressed against the matte finished casting wheel which had been bead blasted to a surface roughness of 150 rms thus embossing the TYRIL 880 polymer layer with a diffuse surface. The same coextrusion coating was applied to the opposite side of the DBEF reflective polarizer. This construction is the same as that described in Example 3 of U.S. Pat. No. 6,673,425. This construction exhibited little or no warping when heated to 85° C. and cooled back down to −35° C. However, when this construction was converted into a part size suitable for use in a liquid crystal display with a conventional die-cutting process (steel rule die having soft rubber backing pressed evenly against a soft rubber pad), cracks of greater than 1 mm formed along the edges of the construction.

Example 1

Tri-layer film with a polycarbonate (MAKROLON 2207 from Bayer) core layer and SAN (TYRIL 880 from Dow) skin layers was coextruded, with SAN extrusion process temperatures less than 260° C. (500° F.), into a nip under a pressure of 8927 kg/m (500 pounds per lineal inch) against a casting tool having a hemisphere-like replication surface at a temperature of 52° C. (125° F.). Casting line speed was 0.38 m/s (75 feet per minute) with no web handling problems due to film brittleness. This tri-layer film had a thickness of 127 um (5 mil) with skin:core:skin thickness ratio of 2:1:2. The film had a haze of 99% and clarity of 50% and was cut into parts without edge cracking. The film exhibited a gain of 1.33 with little or no warping when heated to 85° C. and cooled back down to −35° C. When this film was converted into a part size suitable for use in a liquid crystal display with conventional die-cutting process (steel rule die having soft rubber backing pressed evenly against a soft rubber pad), no cracks of greater than 0.5 mm formed along the edges of the film.

Example 2

Tri-layer film with a polycarbonate/copolyester blend having a Tg of about 110° C. (SA115 from Eastman Chemical) core layer and SAN (TYRIL 880 from Dow) skin layers was coextruded with SAN extrusion process temps less than 260° C. (500° F.), into a nip under a pressure of 892 kg/m (50 pounds per lineal inch) against a belt casting tool having a hemisphere-like replication surface at a temperature of 68° C. (155° F.). Casting line speed was 0.127 m/sec (25 feet per minute) with no web handling problems due to film brittleness. This tri-layer film had a thickness of 178 um (7 mil) with skin:core:skin thickness ratio of 2.5:2:2.5. The film had a haze of 52% and clarity of 9.4% and was cut into parts without edge cracking. The film exhibited a gain of 1.11. After subjecting the film to the Warpage Test, little or no warping was observed.

The film was cut and pieces were adhered to opposite sides of a reflective polarizer film (Vikuiti™ DBEF from 3M™ Co.) using a UV-curable acrylate adhesive. The resulting laminate reflective polarizer had a gain of 1.64 and exhibited little or no warping when heated to 85° C. and cooled back down to −35° C. When this film was converted into a part size suitable for use in a liquid crystal display with conventional die-cutting process (steel rule die having soft rubber backing pressed evenly against a soft rubber pad), no cracks of greater than 0.5 mm formed along the edges of the film.

Example 3

Tri-layer film with a blend of polycarbonate and an amorphous polyester (XYLEX 7200 from GE) core layer and SAN (TYRIL 880 from Dow) skin layers was coextruded as described for Example 2. This tri-layer film had a thickness of 178 um (7 mil) with skin:core:skin thickness ratio of 2.5:2:2.5. The film had a haze of 52% and clarity of 9.4% and was cut into parts without edge cracking. The film exhibited a gain of 1.11 with little or no warping when heated to 85° C. and cooled back down to −35° C.

The film was cut and pieces were adhered to opposite sides of a reflective polarizer film (Vikuiti™ DBEF from 3M™ Co.) using a UV-curable acrylate adhesive. The resulting laminate reflective polarizer had a gain of 1.64. After subjecting the film to the Warpage Test, little or no warping was observed. When this film was converted into a part size suitable for use in a liquid crystal display with conventional die-cutting process (steel rule die having soft rubber backing pressed evenly against a soft rubber pad), no cracks of greater than 0.5 mm formed along the edges of the film.

Example 4

CoPEN5545HD is a copolyester made using the acid and/or esters of naphthalene dicarboxylic acid and terephthalic acid which are condensed with a mixture of diols including 1,6-hexanediol. Specifically, 55 mol % of the diacid moieties result from use of naphthalene dicarboxylic acid or its esters, and 45 mol % of the diacid moieties result from use of terephthalic acid or its esters.

Tri-layer film with a SAN (TYRIL 880) top skin layer, a polycarbonate (MAKROLON 2207 from Bayer) core layer, and a copolyester (CoPEN5545HD from 3M™ Co.) bottom skin layer (as a tie layer) was coextruded onto a reflective polarizer film (Vikuiti™ DBEF from 3M™ Co.) and simultaneously coated into a nip under a pressure of 8070 kg/m (452 pounds per lineal inch) against a casting tool having an elongated hemisphere-like replication surface at a temperature of 104° C. (220° F.). Casting line speed was 0.38 m/sec (75 feet per minute) with no web handling problems due to film brittleness. This tri-layer film had a thickness of 127 um (5 mil) with skin:core:tie thickness ratio of 2:2:1. The film had a haze of approximately 97% and clarity of approximately 8% as measured with a Gardner haze meter. The film exhibited a gain factor of 1.82, as determined using an Effective Transmission tester. (The gain factor of the DBEF film was 1.68). After subjecting the film to the Warpage Test, little or no warping was observed. When this film was converted into a part size suitable for use in a liquid crystal display with conventional die-cutting process (steel rule die having soft rubber backing pressed evenly against a soft rubber pad), no cracks of greater than 0.5 mm formed along the edges of the film.

ADDITIONAL EMBODIMENTS

The following examples illustrate additional embodiments that can be made.

Embodiment 1

Tri-layer film with a polycarbonate (MAKROLON 2207 from Bayer) core layer and styrene acrylate copolymer (NAS 36 from Nova Chemical) skin layers are made as described for Example 1.

Embodiment 2

Five-layer film with a polycarbonate/copolyester blend having a Tg of about 110° C. (SA115 from Eastman Chemical) core layer, SAN (TYRIL 880 from Dow) inner skin layers, and a blend of a propylene-based random copolymer with a medium density polyethylene (60 wt % TOTAL POLYPROPYLENE 8650 from Total Petrochemicals/40 wt % TR130 from CP Chemicals) outer skin layers are made by coextrusion into a nip under a pressure of 892 kg/m (50 pounds per lineal inch) against a casting wheel surface at a temperature of 32° C. (90° F.), and with a casting line speed of 0.127 m/sec (25 feet per minute). This five-layer film is made having a thickness of 178 um (7 mil) with an outer skin:inner skin:core:inner skin:outer skin thickness ratio of 1.5:2:1:2:1.5. The outer skin layers are then removed, and the resulting three-layer film cut into pieces.

One or more pieces of the three-layer film are adhered to a reflective polarizer film using a UV-curable acrylate adhesive. Different combinations of the extruded films are adhered to the reflective polarizer. For example, the film of this embodiment is adhered to the bottom side of the reflective polarizer, and the film from Example 1 adhered to the top side as shown in FIG. 7.

Embodiment 3

Tri-layer film with a styrene acrylate copolymer (NAS 36 from Nova Chemical) top skin layer, a polycarbonate (MAKROLON 2207 from Bayer) core layer, and a copolyester (PETG 6763 from Eastman Chemical) bottom skin layer (as a tie layer) are coextruded onto a reflective polarizer film and simultaneously coated into a nip under a pressure of 8927 kg/m (500 pounds per lineal inch) against a casting tool having a hemisphere-like replication surface at a temperature of 96° C. (205° F.), and with casting line speed was 0.38 m/sec (75 feet per minute). The three coated layers have a total thickness of 127 um (5 mil) with skin:core:tie thickness ratio of 2:2:1. If desired, the same three materials are coextruded onto the opposite side of the reflective polarizer film. The skin layer may or may not be structured.

Embodiment 4

Tri-layer film with SAN (TYRIL from Dow) top skin layer, a polycarbonate (MAKROLON 2207 from Bayer) core layer, and a copolyester (PETG 6763 from Eastman Chemical) bottom skin layer (as a tie layer) are coextruded onto a reflective polarizer film and simultaneously coated into a nip under a pressure of 8927 kg/m (500 pounds per lineal inch) against a casting tool having a hemisphere-like replication surface at a temperature of 96° C. (205° F.), and with casting line speed was 0.38 m/sec (75 feet per minute). The three coated layers have a total thickness of 127 um (5 mil) with skin:core:tie thickness ratio of 2:2:1. If desired, the same three materials are coextruded onto the opposite side of the reflective polarizer film with the outer skin layer being optionally structured.

Embodiment 5

CoPEN7525HD is a copolyester made using the acid and/or esters of naphthalene dicarboxylic acid and terephthalic acid which are condensed with a mixture of diols including 1,6-hexanediol. Specifically, 75 mol % of the diacid moieties result from use of naphthalene dicarboxylic acid or its esters, and 25 mol % of the diacid moieties result from use of terephthalic acid or its esters.

Five-layer film with a polycarbonate (MAKROLON 2207 from Bayer) core layer, SAN (TYRIL 880 from Dow) inner skin layers, and a copolyester (CoPEN7525HD) outer skin layers are made by coextrusion into a nip under a pressure of 8927 kg/m (500 pounds per lineal inch) against a casting tool having a hemisphere-like replication surface at a temperature of 52° C. (125° F.), and with a casting line speed of 0.38 m/sec (75 feet per minute). This five-layer film has a thickness of 178 um (7 mil) with an outer skin:inner skin:core:inner skin:outer skin thickness ratio of 1:2:1:2:1. The resulting film has a gain of at least 1.3 and a haze of greater than 90%.

Embodiment 6

Five-layer film with a polycarbonate (MAKROLON 2207 from Bayer) core layer, SAN (TYRIL 880 from Dow) inner skin layers, and a copolyester (CoPEN7525HD) outer skin layers are coextruded onto a reflective polarizer film and simultaneously coated into a nip under a pressure of 8927 kg/m (500 pounds per lineal inch) against a casting tool having a hemisphere-like replication surface at a temperature of 52° C. (125° F.), and with casting line speed was 0.38 m/sec (75 feet per minute). The five coated layers have a total thickness of 127 um (5 mil) with an outer skin:inner skin:core:inner skin:outer skin thickness ratio of 1:2:1:2:1. If desired, the same five materials are coextruded onto the opposite side of the reflective polarizer film with the outer skin layer being optionally structured.

Embodiment 7

A nucleated crystalline copolyethylene terephthalate with magnesium silicate is prepared as follows: A batch reactor is charged with dimethyl terephthalate (5,000 kg), ethylene glycol (3,002 kg), magnesium silicate (33 kg) pre-dissolved in 500 kg ethylene glycol, manganese (II) acetate (1.2 kg), and antimony (III) acetate (1.6 kg). The mixture is heated to 254° C. at a pressure of 1520 torr ($2 \times 10^5$ N/m$^2$) while removing the transesterification by-product methanol. After 1,649 kg of methanol is removed, triethyl phosphonoacetate (2.45 kg) is added to the reactor and the pressure is gradually reduced to 1 torr (131 N/m$^2$) while heating to 280° C. The condensation by-product, ethylene glycol, is continuously removed until a polymer with an intrinsic viscosity of 0.74 (measured in a 60/40 phenol/dichlorobenzene mixture) is produced.

Three-layer film with the nucleated crystalline copolyester top skin layer, a polycarbonate (MAKROLON 2207 from Bayer) core layer, and a copolyester (PETG 6763 from Eastman Chemical) bottom skin layer (as a tie layer) are coextruded onto a reflective polarizer film and simultaneously coated into a nip under a pressure of 8927 kg/m (500 pounds per lineal inch) against a casting tool having a hemisphere-like replication surface at a temperature of 24° C. (75° F.), and with casting line speed is 0.38 m/sec (75 feet per minute). The three coated layers have a total thickness of 127 um (5 mil) with an outer skin:core:tie thickness ratio of 2:2:1. If desired, the same three materials are coextruded onto the opposite side of the reflective polarizer film with the outer skin layer being optionally structured.

Embodiment 8

A copolyethylene terephthalate with magnesium silicate is made as follows: A batch reactor is charged with 1,4 dimethyl terephthalate (4,866 kg), 1,3,5 dimethyl sodium sulfonated isophthalate (230 kg), ethylene glycol (3,002 kg), sodium acetate (33 kg) pre-dissolved in 500 kg ethylene glycol, cobalt acetate (0.5 kg), zinc acetate (1.1), and antimony (III) acetate (1.6 kg). The mixture is heated to 254° C. at a pressure of 1520 torr ($2 \times 10^5$ N/m$^2$) while removing the transesterification by-product methanol. After 1,649 kg of methanol is removed, triethyl phosphonoacetate (1.5 kg) is added to the reactor and the pressure is gradually reduced to 1 torr (131 N/m$^2$) while heating to 280° C. The condensation by-product, ethylene glycol, is continuously removed until a polymer with an intrinsic viscosity of 0.74 (measured in a 60/40 phenol/dichlorobenzene mixture) is produced.

Three-layer film with the nucleated crystalline copolyester outer skin layer, a polycarbonate (MAKROLON 2207 from Bayer) core layer, and a copolyester (PETG 6763 from Eastman Chemical) bottom skin layer (as a tie layer) are coextruded onto a reflective polarizer film and simultaneously coated into a nip under a pressure of 8927 kg/m (500 pounds per lineal inch) against a casting tool having a hemisphere-like replication surface at a temperature of 24° C. (75° F.), and with casting line speed is 0.38 m/sec (75 feet per minute). The three coated layers have a total thickness of 127 um (5 mil) with an outer skin:core:tie thickness ratio of 2:2:1. If desired, the same three materials are coextruded onto the opposite side of the reflective polarizer film with the outer skin layer being optionally structured.

Embodiment 9

A nucleated crystalline copolyester is prepared by blending PET with 0.5 wt % methylenebis(2,4-di-t-butylphenol) acid sodium phosphate (EUSTAB NA-11 from Eutec Chemical). A batch reactor is charged with dimethyl terephthalate (5,000 kg), ethylene glycol (3,502 kg), manganese (II) acetate (1.2 kg), and antimony (III) acetate (1.6 kg). The mixture is heated to 254° C. at a pressure of two atmospheres (1520 torr or $2\times10^5$ N/m²) while removing the transesterification by-product methanol. After 1,649 kg of methanol is removed, triethyl phosphonoacetate (2.45 kg) is added to the reactor and the pressure is gradually reduced to one torr (131 N/m²) while heating to 280° C. The condensation by-product, ethylene glycol, is continuously removed until a polymer with an intrinsic viscosity of 0.74 (measured in a 60/40 phenol/dichlorobenzene mixture) is produced.

Three-layer film with the nucleated crystalline copolyester outer skin layer, a polycarbonate (MAKROLON 2207 from Bayer) core layer, and a copolyester (PETG 6763 from Eastman Chemical) bottom skin layer (as a tie layer) are coextruded onto a reflective polarizer film and simultaneously coated into a nip under a pressure of 8927 kg/m (500 pounds per lineal inch) against a casting tool having a hemisphere-like replication surface at a temperature of 24° C. (75° F.), and with casting line speed is 0.38 m/sec (75 feet per minute). The three coated layers have a total thickness of 127 um (5 mil) with an outer skin:core:tie thickness ratio of 2:2:1. If desired, the same three materials are coextruded onto the opposite side of the reflective polarizer film with the outer skin layer being optionally structured.

Embodiment 10

Tri-layer film with polycarbonate/copolyester blend (SA115 from Eastman Chemical) skin layers and a SAN (TYRIL 880 from Dow) core layers is coextruded with SAN extrusion process temperatures of less than 260° C. (500° F.), into a nip under a pressure of 892 kg/m (50 pounds per lineal inch) against a belt casting tool having a hemisphere-like replication surface at a temperature of 68° C. (155° F.). 2 wt % UV absorber (TINUVIN 1577) and 0.2 wt % anti-oxidant (ULTRANOX 626) are extrusion blended into the SA115 skin layers for improved environmental stability. The film is made at casting line speeds of at least 50 meters per minute with no web handling problems due to film brittleness. This tri-layer film has a thickness of 150 um (6 mil) with skin:core:skin thickness ratio of 0.5:5:0.5. The film has a gain of at least 1.26, a haze of 52%, and clarity of 9.4% and is cut into parts without edge cracking.

This tri-layer film is coextrusion coated onto opposite sides of a reflective polarizer film (Vikuiti™ DBEF from 3M™ Co.). The resulting laminate reflective polarizer has a gain of at least 1.64 and exhibits little or no warping when tested using the Warpage Test. This laminate is converted into a part size suitable for use in a liquid crystal display with conventional die-cutting process (steel rule die having soft rubber backing pressed evenly against a soft rubber pad), no cracks of greater than 0.5 mm form along the edges of the laminate.

Embodiment 11

Tri-layer film with polycarbonate/copolyester blend (XYLEX 7200 from GE) skin layers and a SAN (TYRIL 880 from Dow) core layer is coextruded onto a belt casting tool having hemispheric like structures. 2 wt % UV absorber (TINUVIN 1577) and 0.2 wt % anti-oxidant (ULTRANOX 626) is extrusion blended into the XYLEX 7200 skin layers for improved environmental stability. The film is made at a casting line speeds of at least 50 meters per minute with no web handling problems due to film brittleness. This tri-layer film has a thickness of 150 um (6 mil) with skin:core:skin thickness ratio of 0.5:5:0.5. The film has a gain of at least 1.26, a haze of 52%, and clarity of 9.4% and is cut into parts without edge cracking.

The tri-layer film is coextrusion coated onto opposite sides of a reflective polarizer film (Vikuiti™ DBEF from 3M™ Co.). The resulting laminate reflective polarizer has a gain of at least 1.64 and exhibits little or no warping when heated to 85° C. and cooled back down to −35° C. This laminate is converted into a part size suitable for use in a liquid crystal display with conventional die-cutting process (steel rule die having soft rubber backing pressed evenly against a soft rubber pad), no cracks of greater than 0.5 mm form along the edges of the laminate.

What is claimed is:

1. An optical article, comprising:
    a top layer having a top structured surface that collimates light;
    a core layer secured to the top layer opposite the top structured surface; and
    a bottom layer secured to the core layer opposite the top layer;
    wherein:
        either the top layer or the core layer comprises a first extrudable polymer having a flexural modulus of greater than 2.5 GPa as measured according to ASTM D790, and the other layer comprises a second extrudable polymer, the second extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and
        the bottom layer comprises a third extrudable polymer.

2. The optical article of claim 1, wherein the top structured surface diffuses light.

3. The optical article of claim 1, wherein the top structured surface comprises a plurality of structures having lenticular or prismatic shapes, or a combination thereof.

4. The optical article of claim 3, wherein the structures have random shapes and sizes.

5. The optical article of claim 1, wherein the top structured surface comprises a plurality of structures having hemispherical, ellipsoidal, conical, parabolic, or pyramidal shapes, or combinations thereof.

6. The optical article of claim 5, wherein the structures have random shapes and sizes.

7. The optical article of claim 1, wherein the top structured surface comprises a plurality of structures having random shapes and sizes.

8. The optical article of claim 1, wherein the top structured surface comprises a plurality of structures, each structure having a dimension of from about 1 to about 100 um.

9. The optical article of claim 1, the first extrudable polymer having a flexural modulus greater than about 3 GPa as measured according to ASTM D790.

10. The optical article of claim 1, the top layer comprising the first extrudable polymer, and the first extrudable polymer having a Tg of less than about 140° C.

11. The optical article of claim 10, the first extrudable polymer having a Tg of from about 85 to about 120° C.

12. The optical article of claim 1, the first extrudable polymer comprising one or more polymers selected from the group consisting of styrene acrylonitrile copolymers; styrene (meth)acrylate copolymers; polymethylmethacrylate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; and copolymers of acrylonitrile, butadiene, and styrene.

13. The optical article of claim 1, the top layer comprising fibers, spheres, nanoparticles, or a combination thereof.

14. The optical article of claim 1, the second extrudable polymer having a tensile elongation at break of greater than about 10% as measured according to ASTM D638.

15. The optical article of claim 1, the top layer comprising the second extrudable polymer, and the second extrudable polymer having a Tg of less than about 140° C.

16. The optical article of claim 15, the second extrudable polymer having a Tg of from about 85 to about 120° C.

17. The optical article of claim 1, the second extrudable polymer comprising one or more polymers selected from the group consisting of polycarbonates; polyesters; blends of polycarbonates and polyesters; copolymers of styrene; copolymers of acrylonitrile, butadiene, and styrene; block copolymers of styrene with alkene-polymerized midblocks; acid and/or anhydride functionalized polyolefins; and copolymers of polyethylene and polypropylene.

18. The optical article of claim 1, the core layer comprising fibers, spheres, nanoparticles, or a combination thereof.

19. The optical article of claim 1, wherein the top layer comprises the first extrudable polymer, and the first and third extrudable polymers are the same.

20. The optical article of claim 1, the third extrudable polymer comprising one or more polymers selected from the group consisting of polyesters, functionally-modified polyolefins, and polyurethanes.

21. The optical article of claim 1, the bottom layer comprising a bottom structured surface opposite the core layer, wherein the bottom structured surface diffuses light.

22. The optical article of claim 1, the bottom layer comprising a bottom structured surface opposite the core layer, wherein the bottom structured surface decollimates light less than the top structured surface collimates light.

23. The optical article of claim 1,
the top structured surface comprising a plurality of convex structures; and
the bottom layer comprising a bottom structured surface opposite the core layer, the bottom structured surface comprising a plurality of concave structures.

24. The optical article of claim 1,
the structured surface comprising a plurality of concave structures; and
the bottom layer comprising a bottom structured surface opposite the core layer, the bottom structured surface comprising a plurality of convex structures.

25. The optical article of claim 23, further comprising:
a rough strippable skin layer operatively connected to the bottom structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

26. The optical article of claim 1, further comprising:
a rough strippable skin layer operatively connected to the top structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

27. The optical article of claim 1, further comprising:
a first rough strippable skin layer operatively connected to the top structured surface, the first rough strippable skin layer comprising a first continuous phase and a first disperse phase, the first continuous phase comprising a first continuous phase polymer, and the first disperse phase comprising first particles or a first disperse phase polymer, the first disperse phase polymer being immiscible with the first continuous phase polymer; and
a second rough strippable skin layer operatively connected to the bottom structured surface, the second rough strippable skin layer comprising a second continuous phase and a second disperse phase, the second continuous phase comprising a second continuous phase polymer, and the second disperse phase comprising second particles or a second disperse phase polymer, the second disperse phase polymer being immiscible with the second continuous phase polymer.

28. The optical article of claim 1, wherein the optical article has a birefringence of less than about 0.01.

29. An optical body comprising:
the optical article of claim 1, and
an optical film secured to the bottom layer opposite the core layer, the optical film comprising a polarizer film, a reflective polarizer film, a diffuse blend reflective polarizer film, a diffuser film, a brightness enhancing film, a turning film, a mirror film, or a combination thereof.

30. The optical body of claim 29, further comprising:
a rough strippable skin layer operatively connected to the top structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

31. A display device comprising:
a display panel,
one or more light sources, and
the optical article of claim 1 disposed between the display panel and the one or more light sources.

32. A display device comprising:
a display panel,
one or more light sources, and
the optical body of claim 29 disposed between the display panel and the one or more light sources.

33. An optical body comprising:
a first optical article comprising:
a first top layer having a first top structured surface that collimates light;

a first core layer secured to the first top layer opposite the first top structured surface; and a first bottom layer secured to the first core layer opposite the first top layer;

wherein:

either the first top layer or the first core layer comprises a first extrudable polymer having a flexural modulus of greater than 2.5 GPa as measured according to ASTM D790, and the other layer comprises a second extrudable polymer, the second extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and the first bottom layer comprises a third extrudable polymer;

a second optical article comprising:

a second top layer having a second top structured surface that diffuses light;

a second core layer secured to the second top layer opposite the second top structured surface; and a second bottom layer secured to the second core layer opposite the second top layer;

wherein:

either the second top layer or the second core layer comprises a fourth extrudable polymer having a flexural modulus of greater than 2.5 GPa as measured according to ASTM D790, and the other layer comprises a fifth extrudable polymer, the fifth extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and the second bottom layer comprises a sixth extrudable polymer; and an optical film secured to the first and second bottom layers, the optical film comprising a polarizer film, a reflective polarizer film, a diffuse blend reflective polarizer film, a diffuser film, a brightness enhancing film, a turning film, a mirror film, or a combination thereof.

34. The optical body of claim 33, further comprising:

a rough strippable skin layer operatively connected to the first top structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

35. The optical body of claim 33, further comprising:

a rough strippable skin layer operatively connected to the second top structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

36. The optical body of claim 33, further comprising:

a first rough strippable skin layer operatively connected to the first top structured surface, the first rough strippable skin layer comprising a first continuous phase and a first disperse phase, the first continuous phase comprising a first continuous phase polymer, and the first disperse phase comprising first particles or a first disperse phase polymer, the first disperse phase polymer being immiscible with the first continuous phase polymer; and a second rough strippable skin layer operatively connected to the second top structured surface, the second rough strippable skin layer comprising a second continuous phase and a second disperse phase, the second continuous phase comprising a second continuous phase polymer, and the second disperse phase comprising second particles or a second disperse phase polymer, the second disperse phase polymer being immiscible with the second continuous phase polymer.

37. A display device comprising:

a display panel, one or more light sources, and the optical body of claim 33 disposed between the display panel and the one or more light sources.

38. An optical body comprising:

a first optical article comprising:

a first top layer having a first top structured surface that collimates light;

a first core layer secured to the first top layer opposite the first top structured surface; and a first bottom layer secured to the first core layer opposite the first top layer;

wherein:

either the first top layer or the first core layer comprises a first extrudable polymer having a flexural modulus of greater than 2.5 GPa as measured according to ASTM D790, and the other layer comprises a second extrudable polymer, the second extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and the first bottom layer comprises a third extrudable polymer;

a second optical article comprising:

a second top layer having a second top structured surface that diffuses light; and a second bottom layer secured to the second top layer opposite the second top structured surface;

wherein:

the second top layer comprises either:

a fourth extrudable polymer having a flexural modulus of greater than 2.5 GPa as measured according to ASTM D790, or a fifth extrudable polymer having a flexural modulus of 2.5 GPa or less as measured according to ASTM D790, an impact strength of greater than about 40 J/m as measured according to ASTM D256, and tensile elongation at break of greater than about 5% as measured according to ASTM D638; and the second bottom layer comprises a sixth extrudable polymer; and an optical film secured to the first and second bottom layers, the optical film comprising a polarizer film, a reflective polarizer film, a diffuse blend reflective polarizer film, a diffuser film, a brightness enhancing film, a turning film, a mirror film, or a combination thereof.

39. The optical body of claim 38, further comprising:

a rough strippable skin layer operatively connected to the first top structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

40. The optical body of claim 38, further comprising:
a rough strippable skin layer operatively connected to the second top structured surface, the rough strippable skin layer comprising a continuous phase and a disperse phase, the continuous phase comprising a continuous phase polymer, and the disperse phase comprising particles or a disperse phase polymer, the disperse phase polymer being immiscible with the continuous phase polymer.

41. The optical body of claim 38, further comprising:
a first rough strippable skin layer operatively connected to the first top structured surface, the first rough strippable skin layer comprising a first continuous phase and a first disperse phase, the first continuous phase comprising a first continuous phase polymer, and the first disperse phase comprising first particles or a first disperse phase polymer, the first disperse phase polymer being immiscible with the first continuous phase polymer; and
a second rough strippable skin layer operatively connected to the second top structured surface, the second rough strippable skin layer comprising a second continuous phase and a second disperse phase, the second continuous phase comprising a second continuous phase polymer, and the second disperse phase comprising second particles or a second disperse phase polymer, the second disperse phase polymer being immiscible with the second continuous phase polymer.

42. A display device comprising:
a display panel,
one or more light sources, and
the optical body of claim 38 with the rough strippable skin layer removed, the optical body disposed between the display panel and the one or more light sources.

* * * * *